United States Patent
Wilkens (10) Patent No.: US 11,097,834 B2
(45) Date of Patent: Aug. 24, 2021

(54) FLY-BY-WIRE SYSTEMS AND RELATED OPERATING METHODS

(71) Applicant: HONEYWELL INTERNATIONAL INC., Morris Plains, NJ (US)

(72) Inventor: Dean Wilkens, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 246 days.

(21) Appl. No.: 16/279,552

(22) Filed: Feb. 19, 2019

(65) Prior Publication Data

US 2020/0262544 A1    Aug. 20, 2020

(51) Int. Cl.
| | |
|---|---|
| B64C 13/50 | (2006.01) |
| G05D 1/00 | (2006.01) |
| B64D 43/00 | (2006.01) |
| H04L 12/40 | (2006.01) |

(52) U.S. Cl.
CPC ............ B64C 13/503 (2013.01); B64D 43/00 (2013.01); G05D 1/0077 (2013.01); H04L 12/40 (2013.01); H04L 2012/40215 (2013.01)

(58) Field of Classification Search
None
See application file for complete search history.

(56) References Cited

U.S. PATENT DOCUMENTS

| | | |
|---|---|---|
| 4,472,780 A | 9/1984 | Chenoweth et al. |
| 4,644,538 A | 2/1987 | Cooper et al. |
| 5,493,497 A | 2/1996 | Buus |
| 6,860,452 B2 | 3/2005 | Bacon et al. |
| 7,031,810 B2 | 4/2006 | Foch et al. |
| 7,337,044 B2 | 2/2008 | Platzer et al. |
| 8,538,602 B2 | 9/2013 | Brot |
| 8,690,101 B2 | 4/2014 | Ahmad et al. |
| 9,873,505 B2 | 1/2018 | Bara et al. |
| 9,932,108 B1 | 4/2018 | Viele |
| 10,730,609 B2 * | 8/2020 | Baran ..................... B64C 27/56 |

(Continued)

FOREIGN PATENT DOCUMENTS

| | | |
|---|---|---|
| EP | 3254960 A1 | 12/2017 |
| WO | 9529434 A1 | 11/1995 |

OTHER PUBLICATIONS

Wu et al., "Design of Applying FlexRay-Bus to Federated Architecture for Triple Redundant Reliable UAV Flight Control System", IEEE Conference on Dependable and Secure Computing, Aug. 2017, pp. 73-78. (Year: 2017).*

(Continued)

*Primary Examiner* — Todd Melton
(74) *Attorney, Agent, or Firm* — Lorenz & Kopf, LLP (57) ABSTRACT

Aircraft fly-by-wire systems and related vehicle electrical systems are provided. In one embodiment, an electrical system suitable for use with a control surface of a vehicle, such as an aircraft, is provided. The electrical system includes an asynchronous intermodule bus arrangement, a first vehicle control module, and a second vehicle control module. Each vehicle control module includes a respective interface arrangement to obtain and exchange data from different sensing arrangements with a first frequency, and a respective processing system to obtain the sensed data and determine actuator commands based on the sensed data with a lower frequency.

19 Claims, 4 Drawing Sheets

(56) References Cited

U.S. PATENT DOCUMENTS

| | | | |
|---|---|---|---|
| 2006/0100750 A1 | 5/2006 | Platzer et al. | |
| 2017/0050588 A1 | 2/2017 | Hammerschmidt | |
| 2017/0109297 A1 | 4/2017 | Chang et al. | |
| 2017/0220502 A1 | 8/2017 | Kessler et al. | |
| 2017/0355449 A1* | 12/2017 | Bapat | B64C 13/503 |
| 2019/0036732 A1 | 1/2019 | Dormiani et al. | |
| 2020/0065284 A1* | 2/2020 | Noll | G06F 13/4027 |

OTHER PUBLICATIONS

B. Dołega & P. Rzucidło (2007) Controllers for fault tolerant actuators, Aviation, 11:1, 23-27.

* cited by examiner

FLY-BY-WIRE SYSTEMS AND RELATED OPERATING METHODS

TECHNICAL FIELD

The subject matter described herein relates generally to aircraft systems, and more particularly, embodiments of the subject matter relate to redundant fly-by-wire systems.

BACKGROUND

In some modern aircraft, traditional mechanical flight control systems have been replaced with electrically controlled actuators, often referred to as fly-by-wire. Instead of mechanical linkages between cockpit controls and flight control surfaces, electrical signals are utilized to communicate movements of cockpit controls to actuators for the flight control surfaces. For safety purposes, fly-by-wire systems often employ redundancy to ensure they are fail operational; however, this often increases the amount of wiring and interfaces required. Data integrity may further increase the amount of wiring, circuitry, or other costs. Accordingly, it is desirable to provide a resilient fly-by-wire system that seeks to minimize the amount of wiring and associated costs. Other desirable features and characteristics will become apparent from the subsequent detailed description and the appended claims, taken in conjunction with the accompanying drawings and the foregoing technical field and background.

BRIEF SUMMARY

Vehicle electrical systems suitable for use with an aircraft are provided. One exemplary vehicle electrical system includes a bus arrangement comprising a plurality of buses, a first control module coupled to a first subset of the plurality of buses, a second control module coupled to a second subset of the plurality of buses, and a third control module coupled to a third subset of the plurality of buses. The first subset includes a first bus and a second bus, the second subset includes the first bus and a third bus, and the third subset includes the second bus and the third bus. A first actuation arrangement is coupled to a fourth subset of the plurality of buses that includes the first bus, and a second actuation arrangement is coupled to a fifth subset of the plurality of buses that includes the second bus. The first subset, the second subset, and the third subset are different from one another, and the fourth subset and the fifth subset are different from one another.

In another embodiment, an electrical system suitable for use with a flight control surface of an aircraft is provided. The electrical system includes a plurality of communications buses, a plurality of flight control modules, wherein each of the plurality of flight control modules is connected to a respective subset of the plurality of communications buses that is unique among the plurality of flight control modules, and a plurality of actuation control modules associated with the flight control surface, wherein each of the plurality of actuation control modules is connected to a respective subset of the plurality of communications buses that is unique among the plurality of actuation control modules.

In yet another embodiment, an aircraft fly-by-wire system is provided. The system includes a plurality of controller area network (CAN) buses, a plurality of flight control modules, and a plurality of actuation control modules associated with a flight control surface. Each of the plurality of flight control modules is connected to a distinct subset of the plurality of CAN buses, each of the plurality of actuation control modules is connected to a different subset of the plurality of CAN buses, each of the plurality of actuation control modules is coupled to at least two flight control modules of the plurality of flight control modules via the different subset of the plurality of CAN buses associated therewith, and each of the plurality of actuation control modules is isolated from at least one of the plurality of CAN buses.

In another embodiment, a vehicle electrical system includes an asynchronous intermodule bus arrangement, a first vehicle control module, and a second vehicle control module. The first vehicle control module includes a first interface arrangement coupled to the intermodule bus arrangement, and a first processing system coupled to the first interface arrangement. The first interface arrangement obtains first data from a first sensing arrangement with a first frequency, and the first processing system obtains the first data from the first interface arrangement with a second frequency. The second vehicle control module includes a second interface arrangement coupled to the intermodule bus arrangement to obtain the first data from the first interface arrangement with the first frequency, and the second interface arrangement also obtains second data from a second sensing arrangement with the first frequency. The second vehicle control module also includes a second processing system coupled to the second interface arrangement to obtain the first data and the second data from the second interface arrangement with the second frequency. The first interface arrangement is coupled to the second interface arrangement via the intermodule bus arrangement to obtain the second data from the second interface arrangement with the first frequency and the first processing system obtains the second data from the first interface arrangement with the second frequency. Each of the first processing system and the second processing system determines a respective command for operating an actuation arrangement based at least in part on the first data and the second data with the second frequency, and the first frequency is greater than the second frequency.

In another embodiment, an electrical system suitable for use with a flight control component of an aircraft includes a plurality of sensing arrangements, wherein each of the plurality of sensing arrangements is configured to provide sensor data indicative of a characteristic, a plurality of flight control modules, wherein each of the plurality of flight control modules is connected to a respective one of the plurality of sensing arrangements to obtain the respective sensor data from the respective one of the plurality of sensing arrangements and the plurality of flight control modules are interconnected via a bus arrangement to obtain other sensor data from other ones of the plurality of sensing arrangements from other ones of the plurality of flight control modules, a plurality of communications buses, wherein each of the plurality of flight control modules is connected to a respective subset of the plurality of communications buses that is unique among the plurality of flight control modules, and a plurality of actuation control modules associated with the flight control component, wherein each of the plurality of actuation control modules is connected to a respective subset of the plurality of communications buses that is unique among the plurality of actuation control modules.

In yet another embodiment, an aircraft fly-by-wire system is provided. The system includes a plurality of sensing arrangements, wherein each of the plurality of sensing arrangements is configured to provide sensor data indicative of a position of a user interface device, a plurality of flight control modules communicatively coupled via an intermodule bus arrangement, wherein each of the flight control modules is coupled to a respective one of the plurality of sensing arrangements to obtain the respective sensor data from the respective sensing arrangement and obtain other sensor data from others of the plurality of sensing arrangements via the intermodule bus arrangement, a plurality of controller area network (CAN) buses, wherein each of the plurality of flight control modules is connected to a distinct subset of the plurality of CAN buses, and a plurality of actuation control modules associated with a flight control surface. Each of the plurality of actuation control modules is connected to a different subset of the plurality of CAN buses, each of the plurality of actuation control modules is coupled to at least two flight control modules of the plurality of flight control modules via the different subset of the plurality of CAN buses associated therewith, and each of the plurality of actuation control modules is isolated from at least one of the plurality of CAN buses.

Other desirable features and characteristics of the method and system will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein relate to electrically-controlled vehicle systems. For purposes of explanation, the subject matter is described herein primarily in the context of aircraft where flight control surfaces are controlled using electrical signals, however, the subject matter is not necessarily limited to use with aircraft and may be implemented in an equivalent manner for other types vehicles (e.g., automotive vehicles, marine vessels, or the like).

Figure 1:
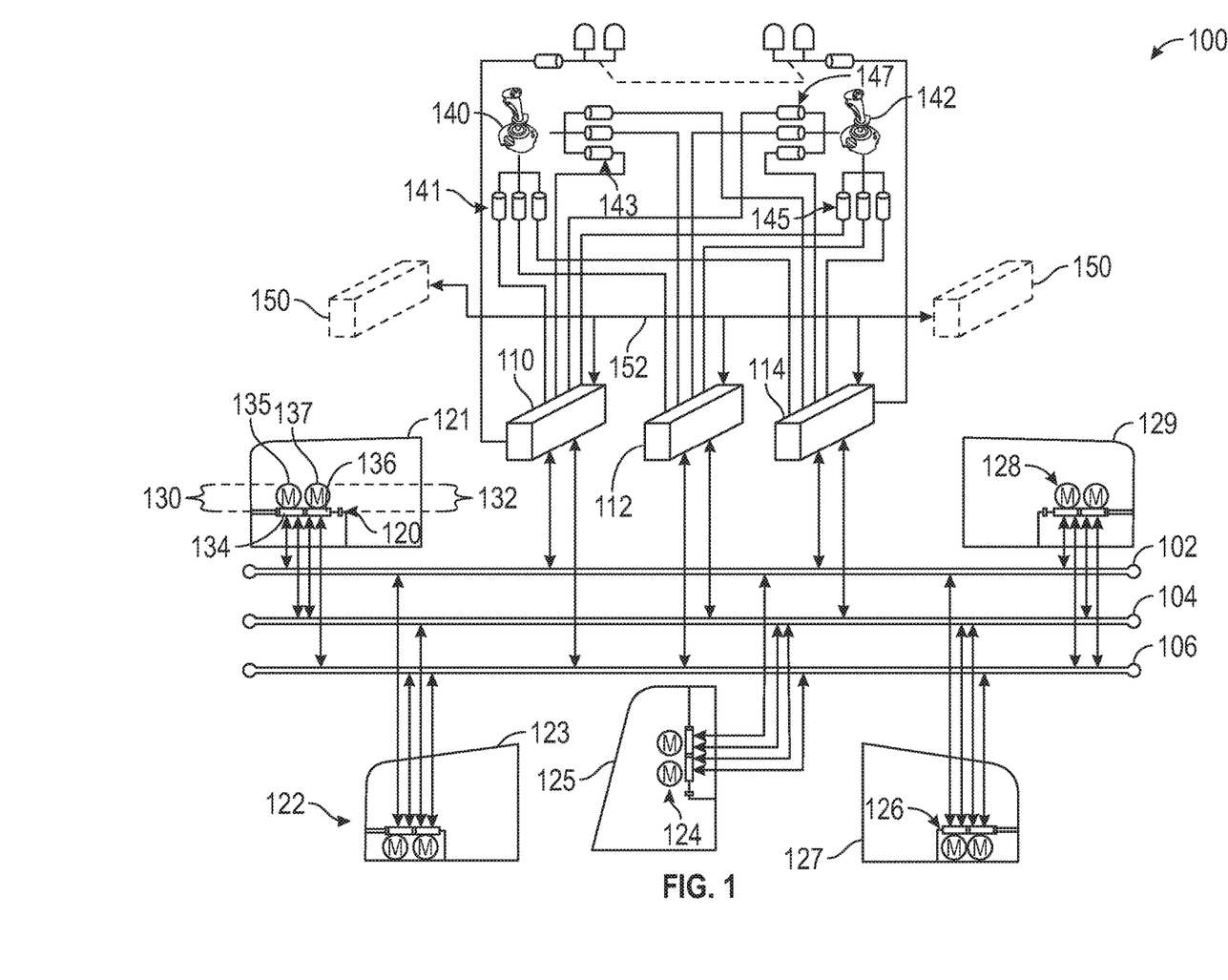
FIG. 1 is a block diagram illustrating a fly-by-wire system suitable for use with an aircraft in accordance with one or more exemplary embodiments.

FIG. 1 depicts an exemplary embodiment of a fly-by-wire system 100 including a plurality of communications buses 102, 104, 106, a plurality of flight control modules 110, 112, 114, and a plurality of actuation systems 120, 122, 124, 126, 128 associated with a plurality of flight control surfaces 121, 123, 125, 127, 129. In the illustrated embodiment, the first flight control module 110 is coupled to a first subset of the buses (e.g., buses 102 and 106), the second flight control module 112 is coupled to a second subset of the buses (e.g., buses 104 and 106), and the third flight control module 114 is coupled to a third subset of the buses (e.g., buses 102 and 104), with each of the subsets of buses being unique, distinct, or otherwise different from one another. In other words, none of the flight control modules 110, 112, 114 are coupled to a common subset of the buses 102, 104, 106, and each of the flight control modules 110, 112, 114 is isolated from at least one of the buses 102, 104, 106 by the absence of a physical electrical connection with the respective isolated bus 102, 104, 106 (e.g., the first flight control module 110 is isolated from the second bus 104, the second flight control module 112 is isolated from the first bus 102, and the third flight control module 114 is isolated from the third bus 106).

In the illustrated embodiment, the actuation systems 120, 122, 124, 126, 128 include at least a pair of redundant actuation arrangements, with each actuation arrangement including an actuator control module and a corresponding actuator associated therewith. For example, a first actuation arrangement 130 of the first actuation system 120 includes a first actuator control module 134 that is coupled to or otherwise configured to control operation of a first actuator 135, such as a motor, that is capable of adjusting a position or orientation of the first flight control surface 121. A second actuation arrangement 132 of the first actuation system 120 includes a second actuator control module 136 that is coupled to or otherwise configured to control operation of a second actuator 137 that is similarly capable of adjusting the position or orientation of the first flight control surface 121. Each actuation arrangement of the actuation systems 120, 122, 124, 126, 128 is coupled to a distinct or unique subset of the buses 102, 104, 106 relative to other actuation arrangements of the respective actuation system 120, 122, 124, 126, 128. For example, the first actuator control module 134 of the first actuation arrangement 130 is coupled to a first subset of the buses (e.g., buses 102 and 104) that is different from a second subset of buses (e.g., buses 104 and 106) that are coupled to the actuator control module 136 of the second actuation arrangement 132. In exemplary embodiments, each of the actuator control modules 134, 136 is coupled to all of the flight control modules 110, 112, 114 via its respective subset of buses 102, 104, 106 it is connected to, thereby achieving a desired level of redundancy without triplicate bus connections or interfaces for either the actuator control modules 134, 136 or the flight control modules 110, 112, 114. At the same time, in exemplary embodiments, each of the actuator control modules 134, 136 of a respective actuation system 120, 122, 124, 126, 128 is isolated from at least one of the buses 102, 104, 106 by the absence of a physical electrical connection with the respective isolated bus 102, 104, 106 (e.g., the first actuator control module 134 is isolated from the third bus 106 and the second actuator control module 136 is isolated from the first bus 102).

The flight control modules 110, 112, 114 generally represent the processing system, processing device, hardware, circuitry, logic, software, firmware and/or other components configured to receive signals indicative of a sensed or measured position, orientation, or adjustment to user interface devices 140, 142 in the cockpit of the aircraft and convert the inputs or adjustments received at the user interface devices 140, 142 into corresponding command signals for one or more flight control surfaces 121, 123, 125, 127, 129 and output or otherwise provide the command signals to the one or more flight control surfaces 121, 123, 125, 127, 129 via the subset of buses 102, 104, 106 that the respective flight control module 110, 112, 114 is coupled to. For purposes of explanation, the flight control modules 110, 112, 114 may alternatively be referred to herein as flight control computers. Each flight control computer 110, 112, 114 may be implemented or realized using any suitable processing system and/or device, such as, for example, one or more processors, central processing units (CPUs), controllers, microprocessors, microcontrollers, processing cores and/or other hardware computing resources configured to support the operation described herein. In this regard, each flight control computer 110, 112, 114 may include or access a data storage element (or memory) capable of storing programming instructions for execution that, when read and executed by the flight control computer 110, 112, 114, cause the flight control computer 110, 112, 114 to support operations of the fly-by-wire system 100.

The cockpit user interface devices 140, 142 onboard the aircraft could be realized as a keypad, touchpad, keyboard, mouse, touch panel (or touchscreen), joystick, knob, line select key or another suitable device adapted to receive input from a user. In the illustrated embodiment, the cockpit user interface devices 140, 142 are realized as joysticks including respective sets of redundant sensors 141, 145 configured to sense the position of a respective joystick 140, 142 in a first reference direction (e.g., a horizontal or x-reference direction) and additional sets of sensors 143, 147 configured to sense the position of the respective joystick 140, 142 in a second reference direction (e.g., a vertical or y-reference direction). Each sensor of each set 141, 143, 145, 147 is coupled to a respective one of the flight control computers 110, 112, 114.

One or more avionics systems 150 are also communicatively coupled to each of the flight control computers 110, 112, 114 via a data bus 152. The avionics systems 150 support navigation, flight planning, and other aircraft control functions in a conventional manner and provide real-time data and/or information regarding the operation of the aircraft to the flight control computers 110, 112, 114 for analysis in conjunction with the sensed user interface device data received from the sensors 141, 143, 145, 147. Practical embodiments will likely include one or more of the following avionics systems suitably configured to support operation of the aircraft: a flight management system (FMS), a navigation system, a communications system, an autopilot system, an autothrust system, a weather system, an air traffic management system, a radar system, a traffic avoidance system, hydraulics systems, pneumatics systems, environmental systems, electrical systems, engine systems, trim systems, lighting systems, crew alerting systems, electronic checklist systems, an electronic flight bag and/or another suitable avionics system.

Based on the data or information received from the respective avionics systems 150 and the sensed position or adjustment to a respective user interface device 140, 142, each of the flight control computers 110, 112, 114 redundantly determines commands for controlling the position of or otherwise operating one or more of the flight control surfaces 121, 123, 125, 127, 129. In this regard, the flight control surfaces 121, 123, 125, 127, 129 generally represent the ailerons, flaps, rudders, spoilers, slats, stabilizers, elevators, or other aerodynamic devices capable of adjusting the attitude of the aircraft. The actuator control modules 134, 136 of the respective actuation systems 120, 122, 124, 126, 128 generally represent the processing system, processing device, hardware, circuitry, logic, software, firmware and/or other components of the respective actuation systems 120, 122, 124, 126, 128 that are capable of receiving a command for the respective flight control surfaces 121, 123, 125, 127, 129 and generating corresponding commands for operating the motor or other actuator 135, 137 associated therewith to adjust or otherwise control the position of the respective flight control surface 121, 123, 125, 127, 129 to track the commands provided by one or more of the flight control computers 110, 112, 114. In this regard, the actuator control modules 134, 136 may be implemented or realized using any suitable processing system and/or device, such as, for example, one or more processors, central processing units (CPUs), controllers, microprocessors, microcontrollers, processing cores and/or other hardware computing resources configured to support the operation described herein.

In exemplary embodiments, each of the buses 102, 104, 106 is realized as a Controller Area Network (CAN) bus, with each of the flight control computers 110, 112, 114 and actuation systems 120, 122, 124, 126, 128 including (or being coupled to a respective CAN bus 102, 104, 106 via) a respective CAN transceiver (or similar communications interface). For example, a first actuation control module 134 may include or be coupled to a first CAN transceiver that is coupled to the first CAN bus 102, and also include or be coupled to a second CAN transceiver that is coupled to the second CAN bus 104. Similarly, the first flight control computer 110 may include or be coupled to a first CAN transceiver that is coupled to the first CAN bus 102, and include or be coupled to a second CAN transceiver that is coupled to the third CAN bus 106.

During operation of the aircraft, each of the flight control computers 110, 112, 114 continually analyzes the outputs of the user interface sensors 141, 143, 145, 147 and the onboard avionics systems 150 to determine corresponding commands for how the respective flight control surfaces 121, 123, 125, 127, 129 should be operated in response to adjustments or changes to the user interface devices 140, 142 substantially in real-time. For each respective flight control surface 121, 123, 125, 127, 129, each of the flight control computers 110, 112, 114 generates a corresponding position command that is encoded into a CAN message having a header that identifies the appropriate actuation system 120, 122, 124, 126, 128 and/or flight control surface 121, 123, 125, 127, 129 as the intended recipient for that command, and each of the flight control computers 110, 112, 114 outputs, transmits, or otherwise provides the resultant message to the respective subset of CAN buses 102, 104, 106 that respective flight control computer 110, 112, 114 is connected to. The actuator control modules 134, 136 of each of the actuation systems 120, 122, 124, 126, 128 continually monitors the respective subset of CAN buses 102, 104, 106 connected thereto for messages identifying its associated flight control surface 121, 123, 125, 127, 129 as the intended recipient. In response to identifying a message intended for its associated flight control surface 121, 123, 125, 127, 129, the actuator control module 134, 136 decodes, parses, or otherwise analyzes the message to identify the commanded adjustment or position for its associated flight control surface 121, 123, 125, 127, 129 and generates corresponding motor commands for operating a motor 135, 137 to achieve the commanded adjustment to the flight control surface 121, 123, 125, 127, 129. In exemplary embodiments, a cyclic redundancy check (CRC) or similar coding schemes may be utilized to protect against communications errors and improve or ensure the integrity of the messages received by the actuator control modules 134, 136.

The subject matter described herein in the context of FIG. 1 provides independent communication paths that achieve relatively high availability by maintaining support for communications between at least one flight control computer and all of the flight control surfaces in the event of an adverse condition or another anomaly or problem with respect to two or more other flight control computers. For example, in an embodiment having three flight control computers, after any one or any two flight control computers experiences problems, the remaining third flight control computer still has the ability to transmit commands to all of the actuation controllers. Additionally, a problem with respect to any individual flight control computer or actuation controller cannot adversely degrade all of the CAN buses because no control module is connected to each of the CAN buses. In this regard, avoiding fully redundant physical electrical connections between all flight control computers and actuator control modules helps ensure that potential common cause electrical shorts or high voltage faults do not propagate across all CAN buses and/or all flight control computers. Relatively high data integrity may also be achieved using CRCs with CAN messages addressed to individual actuators (in addition to galvanic isolation or other isolation between CAN buses). Additionally, the subject matter described herein requires fewer wires than using ARINC 429 (which may require wrap back data buses for monitoring data transmissions and additional signals such as logic discretes to disable actuators when a fault is detected) or other approaches or techniques (e.g., point-to-point connections with intervening logic devices), thereby reducing costs and weight for achieving the same level of redundancy without compromising data integrity. It should be noted that although FIG. 1 depicts a fly-by-wire system 100 that includes three buses 102, 104, 106, three flight control computers 110, 112, 114, and two actuation arrangements 130, 132 per flight control surface, it will be appreciated that the subject matter described herein is not necessarily limited to any particular number of buses, flight control computers, or actuation arrangements per flight control surface. In this regard, other embodiments may include more than three buses, more than three flight control computers, and/or more than two actuation arrangements per flight control surface, as may be desired to achieve a desired level of redundancy or reliability for a particular application.

Figure 2:
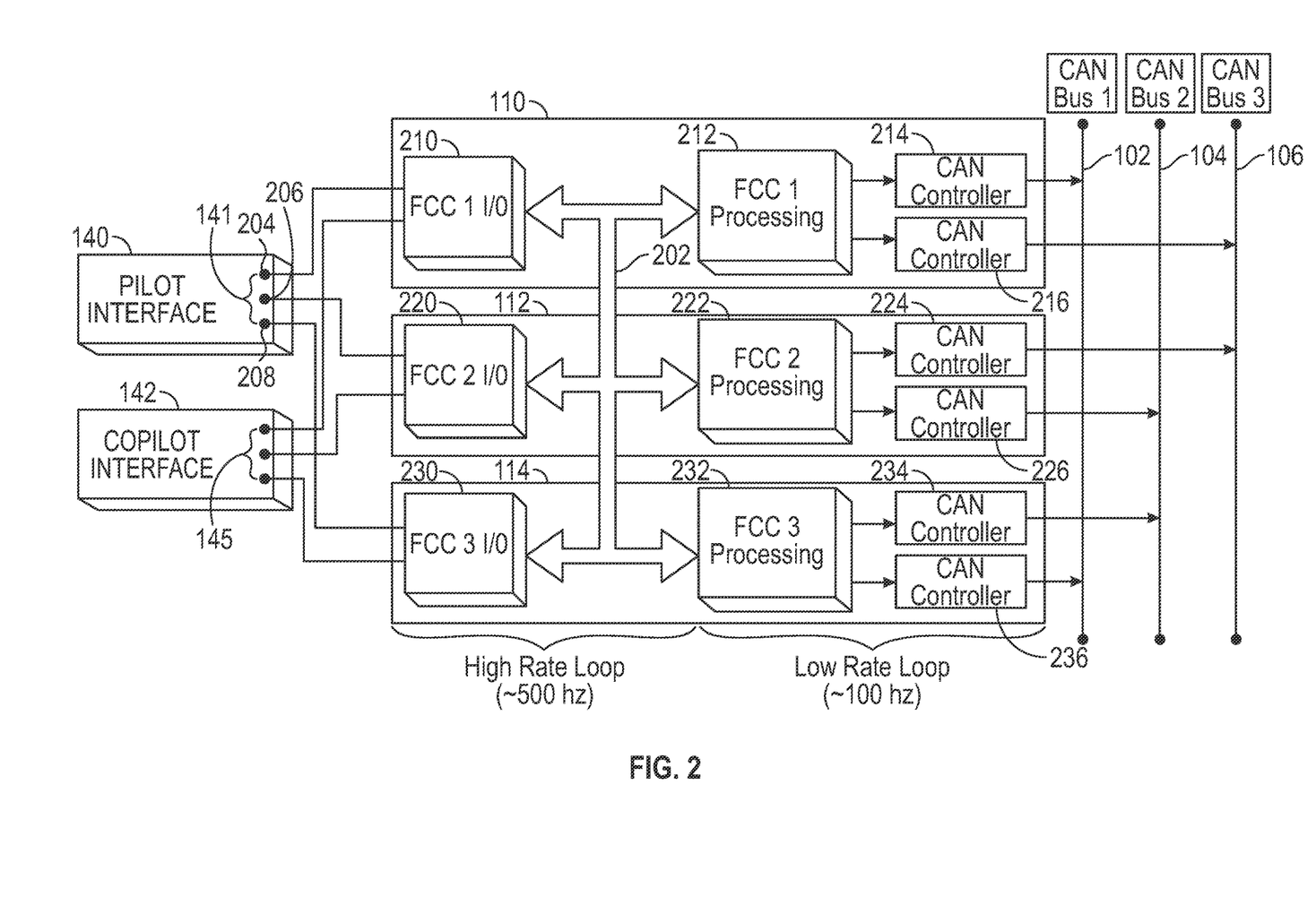
FIG. 2 is a block diagram of an electrical system suitable for use in the fly-by-wire system of FIG. 1 in an exemplary embodiment.

FIG. 2 depicts an exemplary embodiment of an electrical system 200 suitable for use with the fly-by-wire system 100 of FIG. 1. The electrical system 200 provides relatively small, light, and low-cost architecture that supports fail operational redundancy. An asynchronous intermodule bus arrangement 202 is utilized to provide communications between input/output (I/O) interface arrangements 210, 220, 230 of the flight control modules 110, 112, 114 that enable sensor data to be shared among the flight control modules 110, 112, 114. For example, the I/O interface arrangement 210 of the first flight control module 110 is coupled to a first sensing arrangement 204 of a redundant set of sensors 141 associated with a user interface device 140 to receive signals indicative of a sensed or measured position, orientation, or adjustment to the user interface device 140 from the first sensing arrangement 204, while the I/O interface arrangement 220 of the second flight control module 112 is coupled to a second sensing arrangement 206 to receive signals indicative of a sensed or measured position, orientation, or adjustment to the user interface device 140 from the second sensing arrangement 206 and the I/O interface arrangement 230 of the third flight control module 114 is coupled to a third sensing arrangement 208 to receive signals indicative of a sensed or measured position, orientation, or adjustment to the user interface device 140 from the third sensing arrangement 208. The intermodule bus arrangement 202 is then utilized to communicate the sensor data from the second and third sensing arrangements 206, 208 received by the second and third I/O interface arrangements 220, 230 to the first I/O interface arrangement 210, while also being utilized to communicate the sensor data received by the first I/O interface arrangement 210 from the first sensing arrangement 204 to the second and third I/O interface arrangements 220, 230. Thus, each of the I/O interface arrangements 210, 220, 230 is capable of receiving or otherwise obtaining data from each of the redundant sensing arrangements 204, 206, 208 while only being connected to one of the sensing arrangements 204, 206, 208.

The I/O interface arrangements 210, 220, 230 generally represent the combination of analog-to-digital converters, demodulators, receivers, transmitters, and other interface circuitry configured to sample the output of a sensing arrangement 204, 206, 208 or otherwise obtain a sensor data value via the intermodule bus 202. In this regard, the intermodule bus 202 generally represents the wiring, cabling, traces, or other conductive elements utilized to establish communications between I/O interface arrangements 210, 220, 230. For example, referring to FIG. 3 with continued reference to FIG. 2, the first I/O interface arrangement 210 includes a first receiver arrangement 302 that is connected to the output of the first sensing arrangement 204 via a first conductive element (e.g., a conductive trace, a wire, or the like) of the intermodule bus 202 and configured to periodically sample the output of the first sensing arrangement 204, a second receiver arrangement 304 that is connected to a transmitter arrangement 318 of the second I/O interface arrangement 220 via a different conductive element of the intermodule bus arrangement 202 to periodically obtain a sensed data value corresponding to the sampled output of the second sensing arrangement 206, and a third receiver arrangement 306 that is connected to a transmitter arrangement 328 of the third I/O interface arrangement 230 via a different conductive element of the intermodule bus arrangement 202 to periodically obtain a sensed data value corresponding to the sampled output of the third sensing arrangement 208. The first I/O interface arrangement 210 also includes transmitter arrangements 308, 310 configured to transmit or otherwise provide the sensed data value corresponding to the sampled output of the first sensing arrangement 204 to the other I/O interface arrangements 220, 230 via different conductive elements of the intermodule bus arrangement 202.

Figure 3:
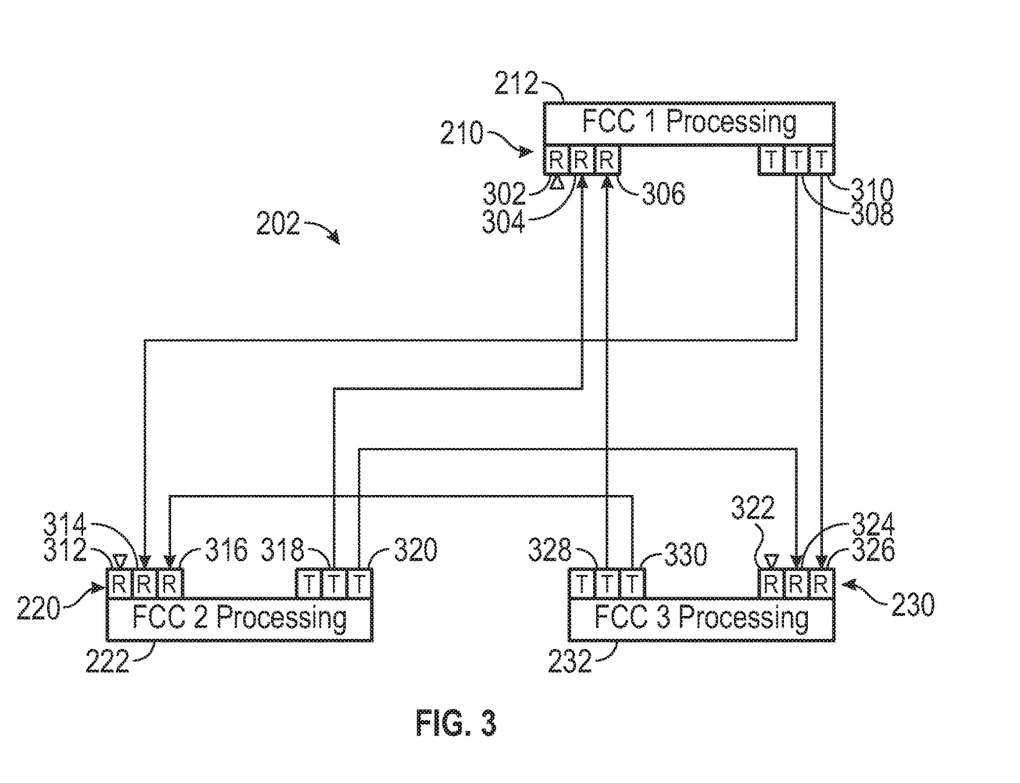
FIG. 3 is a schematic view of an intermodule bus arrangement between interface arrangements of flight control modules in the electrical system of FIG. 2 in accordance with one or more embodiments.

Similarly, second I/O interface arrangement 220 includes a receiver arrangement 312 coupled to the output of the second sensing arrangement 206 and configured to periodically sample the output of the second sensing arrangement 206, a second receiver arrangement 314 coupled to the transmitter arrangement 308 of the first I/O interface arrangement 210 to periodically obtain a sensed data value corresponding to the sampled output of the first sensing arrangement 204, a third receiver arrangement 316 coupled to a transmitter arrangement 330 of the third I/O interface arrangement 230 to periodically obtain the sensed data value corresponding to the sampled output of the third sensing arrangement 208, and transmitter arrangements 318, 320 configured to transmit or otherwise provide the sensed data value corresponding to the sampled output of the second sensing arrangement 206 to the other I/O interface arrangements 210, 230 via the intermodule bus arrangement 202. Likewise, the third I/O interface arrangement 230 includes a receiver arrangement 322 coupled to the output of the third sensing arrangement 208 and configured to periodically sample the output of the third sensing arrangement 208, a receiver arrangement 324 coupled to the transmitter arrangement 310 of the first I/O interface arrangement 210 to periodically obtain a sensed data value corresponding to the sampled output of the first sensing arrangement 204, a receiver arrangement 326 coupled to a transmitter arrangement 320 of the second I/O interface arrangement 220 to periodically obtain the sensed data value corresponding to the sampled output of the second sensing arrangement 206, and transmitter arrangements 328, 330 configured to transmit or otherwise provide the sensed data value corresponding to the sampled output of the third sensing arrangement 208 to the other I/O interface arrangements 210, 220 via the intermodule bus arrangement 202. In a similar manner, the I/O interface arrangements 210, 220, 230 may be configured to obtain and communicate sensor data corresponding to other sets of redundant sensors 143, 145, 147.

In exemplary embodiments, the I/O interface arrangements 210, 220, 230 are configured to sample the sensing arrangements 204, 206, 208 and communicate sensor data amongst one another via the intermodule bus arrangement 202 at a frequency that is greater than the rate at which the processing system 212, 222, 232 obtain sensor data and determine corresponding actuation commands. For example, in one embodiment, the I/O interface arrangements 210, 220, 230 periodically obtain sensed data values from their respective sensing arrangement 204, 206, 208 or the other I/O interface arrangements 210, 220, 230 at a frequency of 500 Hz. In this regard, the first I/O interface arrangement 210 may sample or otherwise obtain data values from its receiver arrangements 302, 304, 306 at a rate of 500 Hz while concurrently transmitting the most recent sensed data value from the first sensing arrangement 204 on the intermodule bus arrangement 202 via the transmitter arrangements 308, 310 at a rate of 500 Hz. In exemplary embodiments, the I/O interface arrangements 210, 220, 230 operate at substantially the same frequency (e.g., 500 Hz) but are not synchronized or are otherwise asynchronous with respect to one another. Additionally, as described in greater detail below, the I/O interface arrangements 210, 220, 230 operate at a greater frequency relative to the frequency associated with the processing systems 212, 222, 232 (e.g., 100 Hz). In this regard, by virtue of the I/O interface arrangements 210, 220, 230 oversampling the sensor data relative to the frequency of the processing systems 212, 222, 232, the time delay or transport delay between when a sensed data value is obtained or captured and when it is processed by the processing systems 212, 222, 232 is reduced. For example, when the I/O interface arrangements 210, 220, 230 operate at 500 Hz and the processing systems 212, 222, 232 operate at 100 Hz, roughly four-fifths of the sensor data is discarded or otherwise not acted on by the processing systems 212, 222, 232, but the sensed data values obtained and acted on by the processing systems 212, 222, 232 have a maximum delay of 2 milliseconds between when a respective sensed data value was obtained and when it is processed.

Referring again to FIG. 2 with continued reference to FIG. 1, each of the flight control modules 110, 112, 114 includes a respective processing system 212, 222, 232 that is coupled to its respective I/O interface arrangement 210, 220, 230 to receive the sensor data corresponding to the sensing arrangements 204, 206, 208. Each respective processing system 212, 222, 232 is configured to generate or otherwise determine command signals for one or more flight control surfaces 121, 123, 125, 127, 129 based on the sensor data indicative of the inputs or adjustments received at a user interface device 140.

Figure 4:
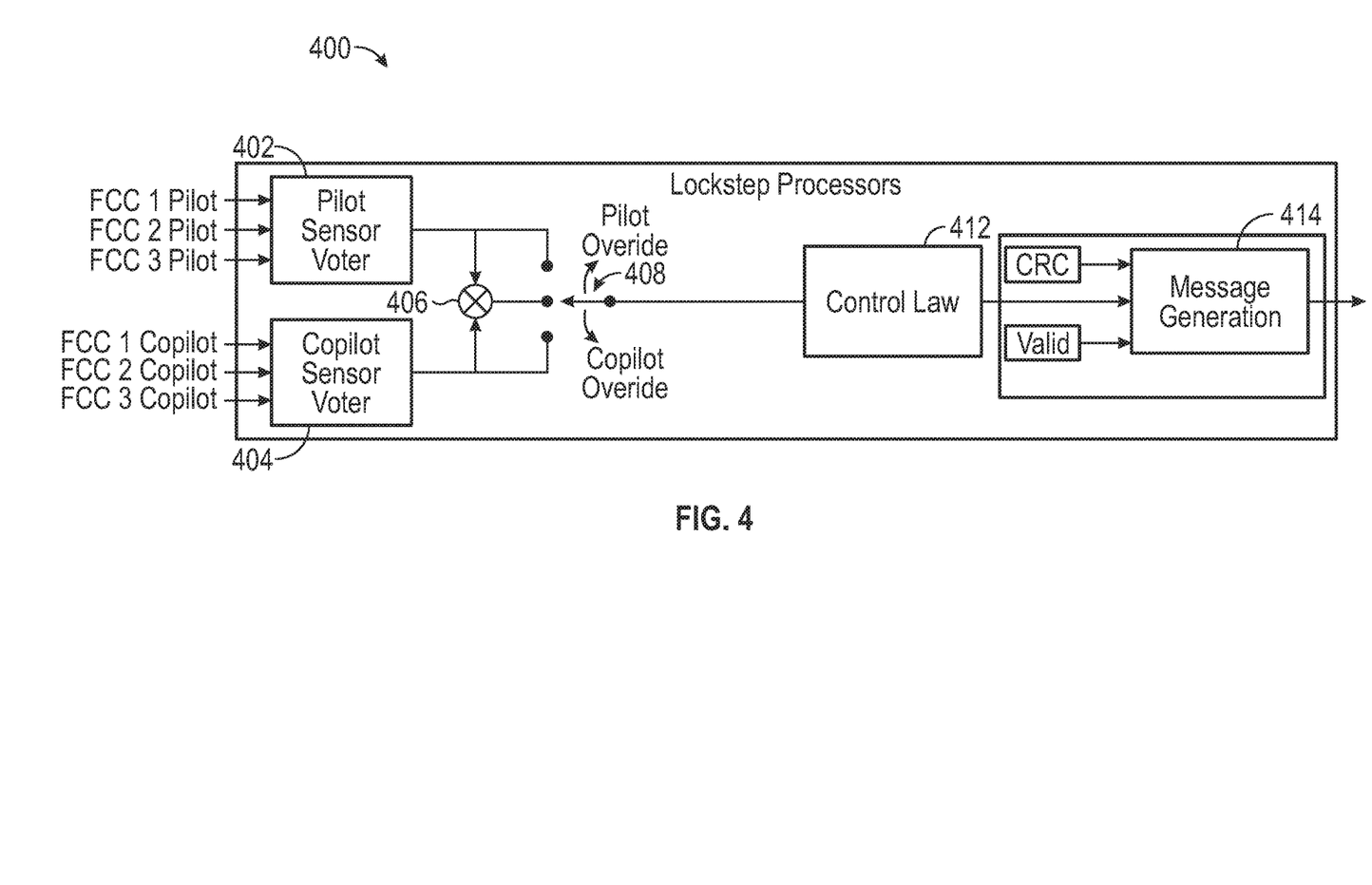
FIG. 4 is a block diagram of a control system suitable for implementation by a flight control module in the electrical system of FIG. 2 in accordance with one or more embodiments.

FIG. 4 depicts an exemplary embodiment of a control system 400 suitable for implementation by each of the processing systems 212, 222, 232 of the flight control modules 110, 112, 114. The illustrated control system 400 includes a first sensor voting block 402 configured to vote the sensor data for a first set of redundant sensors. For example, the first sensor voting block 402 of the first processing system 212 may be configured to vote the sensor data sample obtained from the first sensing arrangement 204 by its associated I/O interface arrangement 210 with the sensor data samples corresponding to the other sensing arrangements 206, 208 of the redundant sensor set 141 obtained from the other flight control modules 112, 114 via the intermodule bus arrangement 202, resulting in a voted sensed position for a pilot user interface device 140. In this regard, depending on the embodiment, the voted sensed position may be realized as the mean or averaged sensed position, the median or middle sensed position, or some other combination of the sensed positions to provide a high integrity sensed position output. Similarly, a second sensor voting block 404 may be configured to vote a sensor data sample obtained from its associated sensor of a redundant sensor set 145 by its associated I/O interface arrangement 210 with sensor data samples corresponding to the other sensing arrangements of the redundant sensor set 145 obtained from the other flight control modules 112, 114 via the intermodule bus arrangement 202, resulting in a voted sensed position for a co-pilot user interface device 142.

In the illustrated example, the control system 400 includes a combination block 406 configured to sum or otherwise combine the voted pilot position and the voted co-pilot position from the respective voter blocks 402, 404, followed by override logic 408 that is capable of selecting one of the voted pilot position, the voted co-pilot position, or the combined position for use in determining actuator commands. For example, a pilot's user interface device 140 may include a button that allows the pilot to effectively lock out the co-pilot by operating the override logic 408 to select the voted pilot position corresponding to the pilot's user interface device 140 for provisioning to the control law block 412, or vice versa (e.g., in some embodiments the co-pilot could similarly override the pilot). The control law block 412 generally represents the algorithm or control scheme implemented by the processing systems 212, 222, 232 of the flight control modules 110, 112, 114 to determine actuator commands based on the voted sensed position of the user interface device(s) 140, 142 provided by the override logic 408.

In exemplary embodiments, the actuator command generated by the control law block 412 is provided to a message generation block 414 that is configured to encode or otherwise translate the actuator command into a command message. In exemplary embodiments, the message generation block 414 generates a cyclic redundancy check (CRC) or other error-detection code to be encoded or associated with the actuator command. Additionally, in exemplary embodiments, the message generation block 414 also marks or tags the actuator command with a validity indication (e.g., by setting a validity bit position within the message to a logical low value or logic '0' to indicate invalidity or otherwise setting the validity bit position within the message to a logical high value or logic '1' to indicate validity). For example, the voter blocks 402, 404 may be configured to monitor the incoming sensor data and detect or otherwise identify when the input sensor data is invalid, and in response, output, command, or otherwise set the validity bit to indicate invalidity. When the validity indication indicates an actuator command is or may be invalid, an actuator control module may discard or otherwise ignore the actuator command.

Referring to FIGS. 2 and 4, in exemplary embodiments, each of the processing systems 212, 222, 232 samples, receives, or otherwise obtains the sensor data from its respective I/O interface arrangement 210, 220, 230 and generates corresponding actuator commands at a frequency that is less than the frequency at which its respective I/O interface arrangement 210, 220, 230 operates. For example, in one or more embodiments, the processing systems 212, 222, 232 obtain sensor data and generate actuator commands at a frequency of 100 Hz, while the I/O interface arrangements 210, 220, 230 obtain and communicate sensor data samples at a frequency of 500 Hz. In exemplary embodiments, each of the processing systems 212, 222, 232 is implemented or otherwise realized as a pair of lockstep processors configured to implement the control system 400 in lockstep within a respective flight control module 110, 112, 114. In this regard, the lockstep processing improves reliability and integrity of the resulting actuator command by performing comparisons before, during and/or after processing of the sensor data by each of the components of the control system 400 to ensure consistency. In one or more embodiments, in the event of any discrepancy, one of the processors may set a flag or otherwise provide indication to the message generation block 414 to marks or tags the actuator command with the validity indication set to indicate potential invalidity (e.g., by setting a validity bit position to a logical zero value). Additionally, in some embodiments, the lockstep processors are configured to automatically reset in the event of a discrepancy.

Still referring to FIG. 2, each of the processing systems 212, 222, 232 provides the actuator command messages generated by the control system 400 to the appropriate flight control surface(s) 121, 123, 125, 127, 129 via the subset of buses 102, 104, 106 that the respective flight control module 110, 112, 114 is coupled to via its associated CAN control modules 224, 226, 234, 236, 244, 246. In this regard, the CAN control modules 224, 226, 234, 236, 244, 246 generally represent the components of the flight control modules 110, 112, 114 that are configured to encode actuator commands into a corresponding CAN message having a header that identifies the appropriate actuation system 120, 122, 124, 126, 128 and/or flight control surface 121, 123, 125, 127, 129 as the intended recipient for that command and then outputs, transmits, or otherwise provides the resultant message to the CAN buses 102, 104, 106 that respective CAN control module is connected to, as described above. For example, the CAN control module 214 may encode an actuator command provided by the first processing system 212 (or output by control system 400) into a CAN message addressed to the appropriate recipient and then transmit the CAN message containing that actuator command via the first CAN bus 102 connected to CAN control module 214, while CAN control module 216 similarly encodes the same actuator command provided by the first processing system 212 into a CAN message addressed to the same recipient and then transmits its generated CAN message via the respective CAN bus 106 connected to CAN control module 216.

It should be noted that in addition to the availability, redundancy, reliability, and other advantages achieved by the communications configuration described above in the context of FIG. 1, the subject matter described herein in the context of FIGS. 2-4 further provides actuator commands having relatively high integrity by virtue of the sensor voting and lockstep processing. Additionally, utilizing the higher frequency asynchronous bus arrangement to communicate sensor data minimizes the overall transport delay between pilot sensors and control surface command output by enabling sampling and sharing of the sensor data at a higher rate. Asynchronous operation also eliminates the potential for a common mode fault in a flight control module that could otherwise affect update rates and/or cause incorrect computations that could be transferred to other flight control modules. It should be noted that although the subject matter may be described herein primarily in the context of sensor data associated with pilot inputs or other input received via user interface devices utilized to operate flight control surfaces in fly-by-wire aircraft, the subject matter described herein is not intended to be limited to sensor data or any particular type of sensing arrangement, and may be utilized in the context of other sensors (e.g., inertial reference sensors) or any other type of measurement or command data (e.g., flight plan data) that may be input to a flight control module for purposes of determining actuator commands. Accordingly, the subject matter may be implemented in an equivalent manner for autonomously or remotely controlled aircraft. Additionally, the subject matter described herein is not limited to flight control surfaces and may implemented in an equivalent manner for other flight control components (e.g., motors, propellers, rotors, and/or the like). In this regard, the subject matter is not necessarily limited to use with aircraft and may be implemented in an equivalent manner in electrically-controlled vehicle systems associated with other types vehicles (e.g., automotive vehicles, marine vessels, or the like).

For the sake of brevity, conventional techniques related to fly-by-wire systems, avionics systems, avionics standards, avionics installations, communications buses, communications protocols, encoding and/or decoding, formatting, lockstep processing, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. Thus, although FIG. 1 may depict direct electrical connections between components, alternative embodiments may employ intervening circuit elements and/or components while functioning in a substantially similar manner.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly coupled to one another, additional intervening elements, devices, features, or components may be present in an embodiment of the depicted subject matter. In addition, certain terminology may also be used in the following description for the purpose of reference only, and thus are not intended to be limiting. For example, the terms "first", "second" and other such numerical terms referring to structures do not imply a sequence or order unless clearly indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A vehicle electrical system comprising:
   an asynchronous intermodule bus arrangement;
   a first vehicle control module comprising:
      a first interface arrangement coupled to the intermodule bus arrangement, the first interface arrangement obtaining first data from a first sensing arrangement with a first frequency; and
      a first processing system coupled to the first interface arrangement to obtain the first data from the first interface arrangement with a second frequency;
   a second vehicle control module comprising:
      a second interface arrangement coupled to the intermodule bus arrangement to obtain the first data from the first interface arrangement, the second interface arrangement obtaining second data from a second sensing arrangement with the first frequency; and
      a second processing system coupled to the second interface arrangement to obtain the first data and the second data from the second interface arrangement with the second frequency, wherein:
         the first interface arrangement is coupled to the second interface arrangement via the intermodule bus arrangement to obtain the second data from the second interface arrangement with the first frequency;
         the first processing system obtains the second data from the first interface arrangement with the second frequency;
         each of the first processing system and the second processing system determines a respective command for operating an actuation arrangement based at least in part on the first data and the second data with the second frequency; and
         the first frequency is greater than the second frequency.

2. The vehicle electrical system of claim 1, wherein the first processing system and the second processing system determine the respective commands for operating the actuation arrangement in lockstep.

3. The vehicle electrical system of claim 1, wherein each of the first processing system and the second processing system compares the first and second data to obtain voted data prior to applying a control law to the voted data to determine the respective command for operating the actuation arrangement.

4. The vehicle electrical system of claim 1, wherein the first processing system and the second processing system are asynchronous.

5. The vehicle electrical system of claim 1, further comprising a bus arrangement comprising a plurality of buses, wherein each of the first vehicle control module and the second vehicle control module is coupled to the actuation arrangement via a different one of the plurality of buses.

6. The vehicle electrical system of claim 5, wherein:
   the first vehicle control module is coupled to a first subset of the plurality of buses, the first subset including a first bus and a second bus;
   the second vehicle control module coupled to a second subset of the plurality of buses, the second subset including the first bus and a third bus; and
   the actuation arrangement comprises:
      a first control module coupled to a third subset of the plurality of buses including the first bus; and
      a second control module coupled to a fourth subset of the plurality of buses, the fourth subset including the second bus; and
   the first and second subsets are different; and
   the third and fourth subsets are different.

7. The vehicle electrical system of claim 6, further comprising a flight control surface coupled to each of the first and second actuation arrangements.

8. The vehicle electrical system of claim 7, further comprising a user interface device, wherein the first sensing arrangement is coupled to the user interface device to obtain the first data indicative of a position of the user interface device and the second sensing arrangement is coupled to the user interface device to obtain the second data indicative of the position of the user interface device.

9. The vehicle electrical system of claim 5, wherein the plurality of buses comprises a plurality of controller area network (CAN) buses.

10. The vehicle electrical system of claim 9, wherein:
   the first vehicle control module comprises:
      a first CAN controller coupled between the first processing system and a first CAN bus of the plurality of CAN buses to transmit a first command for operating the actuation arrangement determined by the first vehicle control module to the actuation arrangement via the first CAN bus; and
      a second CAN controller coupled between the first processing system and a second CAN bus of the plurality of CAN buses to transmit the first command for operating the actuation arrangement to the actuation arrangement via the second CAN bus; and
   the second vehicle control module comprises a third CAN controller coupled between the second processing system and a third CAN bus of the plurality of CAN buses to transmit a second command for operating the actuation arrangement determined by the second vehicle control module to the actuation arrangement via the third CAN bus.

11. The vehicle electrical system of claim 10, wherein the first vehicle control module is not coupled to the third CAN bus.

12. The vehicle electrical system of claim 1, further comprising a user interface device coupled to each of the first and second sensing arrangements, wherein the first and second data are influenced by an adjustment to the user interface device.

13. The vehicle electrical system of claim 1, wherein the asynchronous intermodule bus arrangement comprises:
   a first conductive element connected between a first transmitter of the first interface arrangement and a first receiver of the second interface arrangement; and
   a second conductive element connected between a second transmitter of the second interface arrangement and a second receiver of the first interface arrangement.

14. The vehicle electrical system of claim 13, wherein:
   the first interface arrangement is configured to transmit the first data via the first transmitter with the first frequency and sample the second receiver with the first frequency; and
   the second interface arrangement is configured to transmit the second data via the second transmitter with the first frequency and sample the first receiver with the first frequency.

15. The vehicle electrical system of claim 14, wherein the first interface arrangement and the second interface arrangement are asynchronous.

16. An electrical system suitable for use with a flight control component of an aircraft, the electrical system comprising:
   a plurality of sensing arrangements, wherein each of the plurality of sensing arrangements is configured to provide sensor data indicative of a characteristic;
   a plurality of flight control modules, wherein each of the plurality of flight control modules is connected to a respective one of the plurality of sensing arrangements to obtain the respective sensor data from the respective one of the plurality of sensing arrangements and the plurality of flight control modules are interconnected via a bus arrangement to obtain other sensor data from other ones of the plurality of sensing arrangements from other ones of the plurality of flight control modules;
   a plurality of communications buses, wherein each of the plurality of flight control modules is connected to a respective subset of the plurality of communications buses that is unique among the plurality of flight control modules; and
   a plurality of actuation control modules associated with the flight control component, wherein:
      each of the plurality of actuation control modules is connected to a respective subset of the plurality of communications buses that is unique among the plurality of actuation control modules; and
      each of the plurality of actuation control modules is not connected to at least one of the plurality of communications buses.

17. The electrical system of claim 16, further comprising a plurality of actuators coupled to a flight control surface and operable to adjust a position of the flight control surface, wherein each of the plurality of actuation control modules is coupled to a respective one of the plurality of actuators.

18. The electrical system of claim 17, further comprising a user interface device coupled to the plurality of sensing arrangements, wherein the characteristic comprises a position of the user interface device and the flight control component comprises a flight control surface.

19. An aircraft fly-by-wire system comprising:
   a plurality of sensing arrangements, wherein each of the plurality of sensing arrangements is configured to provide sensor data indicative of a position of a user interface device;
   a plurality of flight control modules communicatively coupled via an intermodule bus arrangement, wherein each of the flight control modules is coupled to a respective one of the plurality of sensing arrangements to obtain the respective sensor data from the respective sensing arrangement and obtain other sensor data from others of the plurality of sensing arrangements via the intermodule bus arrangement;
   a plurality of controller area network (CAN) buses, wherein each of the plurality of flight control modules is connected to a distinct subset of the plurality of CAN buses; and
   a plurality of actuation control modules associated with a flight control surface, wherein:
      each of the plurality of actuation control modules is connected to a different subset of the plurality of CAN buses;
      each of the plurality of actuation control modules is coupled to at least two flight control modules of the plurality of flight control modules via the different subset of the plurality of CAN buses associated therewith; and
      each of the plurality of actuation control modules is isolated from at least one of the plurality of CAN buses.

* * * * *